US012609598B2

(12) United States Patent
Wu et al.

(10) Patent No.: US 12,609,598 B2
(45) Date of Patent: Apr. 21, 2026

(54) LINEAR VIBRATION MOTOR WITH WEIGHT HAVING TWO DRIVING ASSEMLBIESS AND MAGNETS WITH COMMON POLE PLATE AND OTHER PLATES

(71) Applicant: AAC Microtech (Changzhou) Co., Ltd., Changzhou (CN)

(72) Inventors: Jie Wu, Changzhou (CN); Junsheng Wang, Changzhou (CN); Aijie Zhu, Changzhou (CN); Qiang Zhang, Changzhou (CN); Yanxue Zhi, Changzhou (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 372 days.

(21) Appl. No.: 18/321,749

(22) Filed: May 22, 2023

(65) Prior Publication Data

US 2024/0186877 A1     Jun. 6, 2024

Related U.S. Application Data

(63) Continuation of application No. PCT/CN2022/136723, filed on Dec. 6, 2022.

(51) Int. Cl.
*H02K 33/00*     (2006.01)
*H02K 33/16*     (2006.01)
(52) U.S. Cl.
CPC ................................... *H02K 33/16* (2013.01)

(58) Field of Classification Search
CPC ........ H02K 33/00; H02K 33/02; H02K 33/16; H02K 35/00; H02K 35/02; H02K 33/04;
(Continued)

(56) References Cited

U.S. PATENT DOCUMENTS 3,279,690 A * 10/1966 Masterson ............... G06K 1/02
                                                        234/119
8,278,786 B2 * 10/2012 Woo ........................ H02K 33/16
                                                        310/15

(Continued)

FOREIGN PATENT DOCUMENTS

CN     214626752 U  * 11/2021  ............. H02K 33/16
CN     214626753 U  * 11/2021  ............. H02K 33/16

*Primary Examiner* — Maged M Almawri
(74) *Attorney, Agent, or Firm* — Wiersch Law Group

(57)     ABSTRACT

A linear vibration motor, including a housing, a weight suspended in the housing, at least two driving assemblies driving the weight to horizontally vibrate, and an elastic connector elastically supporting the weight. The weight includes an inner wall enclosing to form a through hole, each driving assembly includes a solenoid fixed to the housing and a magnet assembly fixed to the inner wall, the magnet assembly includes first magnets arranged at two sides of the solenoid along a vibrating direction of the weight, the first magnets are magnetized along a direction perpendicular to the vibrating direction, the first magnets at two sides of the solenoid have poles of a same polarity opposite to each other, each first magnet includes a common magnet located between two adjacent solenoids and shared by two adjacent driving assemblies. A driving force of the linear vibration motor is significantly improved.

5 Claims, 4 Drawing Sheets

(58) Field of Classification Search
CPC ...... H02K 33/06; H02N 11/00; H02N 11/002; H02N 11/04
USPC ........ 310/25, 15, 12.01, 81, 80, 321, 20, 21, 310/28–30, 36–37, 40 MM
See application file for complete search history.

(56) References Cited

U.S. PATENT DOCUMENTS

| | | | | |
|---|---|---|---|---|
| 8,288,898 | B2 * | 10/2012 | Jun | H02K 33/16 310/34 |
| 8,878,401 | B2 * | 11/2014 | Lee | H02K 33/16 310/15 |
| 9,774,236 | B2 * | 9/2017 | Xu | H02K 33/04 |
| 9,936,302 | B2 * | 4/2018 | Linghu | H04R 9/06 |
| 10,076,771 | B2 * | 9/2018 | Xu | H02K 33/12 |
| 10,103,614 | B2 * | 10/2018 | Guo | H02K 33/18 |
| 10,116,194 | B2 * | 10/2018 | Mao | H02K 11/215 |
| 10,158,278 | B2 * | 12/2018 | Mao | H02K 33/16 |
| 10,637,339 | B2 * | 4/2020 | Liu | H02K 1/34 |
| 10,710,115 | B2 * | 7/2020 | Huang | H02K 33/02 |
| 10,797,576 | B2 * | 10/2020 | Wu | H02K 33/18 |
| 10,931,185 | B2 * | 2/2021 | Tang | H02K 33/12 |
| 10,971,984 | B2 * | 4/2021 | Liu | H02K 33/10 |
| 11,201,531 | B2 * | 12/2021 | Jin | H02K 33/16 |
| 11,404,948 | B2 * | 8/2022 | Liu | H02K 33/16 |
| 2011/0006618 | A1 * | 1/2011 | Lee | H02K 33/16 310/25 |
| 2011/0198949 | A1 * | 8/2011 | Furuich | H02K 33/16 310/25 |
| 2011/0241451 | A1 * | 10/2011 | Park | H02K 33/16 310/25 |
| 2011/0266892 | A1 * | 11/2011 | Wauke | H02K 33/18 310/25 |
| 2012/0169148 | A1 * | 7/2012 | Kim | H02K 33/16 310/25 |
| 2015/0123498 | A1 * | 5/2015 | Yang | H02K 33/16 310/25 |
| 2016/0013710 | A1 * | 1/2016 | Dong | H02K 33/16 310/25 |
| 2016/0226358 | A1 * | 8/2016 | Mao | H02K 33/16 |
| 2016/0226359 | A1 * | 8/2016 | Guo | H02K 33/16 |
| 2016/0254736 | A1 * | 9/2016 | Jin | H02K 33/16 310/25 |
| 2017/0120298 | A1 * | 5/2017 | Mao | B06B 1/045 |
| 2017/0222532 | A1 * | 8/2017 | Wang | H02K 33/16 |
| 2018/0248457 | A1 * | 8/2018 | Shi | F16F 15/08 |
| 2018/0297075 | A1 * | 10/2018 | Ling | B06B 1/045 |
| 2018/0297076 | A1 * | 10/2018 | Xu | B06B 1/045 |
| 2018/0351442 | A1 * | 12/2018 | Liu | H02K 33/16 |
| 2018/0358879 | A1 * | 12/2018 | Liu | H02K 1/34 |
| 2019/0036435 | A1 * | 1/2019 | Zhu | H02K 33/02 |
| 2019/0044425 | A1 * | 2/2019 | Zu | H02K 33/02 |
| 2019/0052160 | A1 * | 2/2019 | Oi | H02K 33/02 |
| 2019/0305637 | A1 * | 10/2019 | Suzuki | B06B 1/045 |
| 2020/0044526 | A1 * | 2/2020 | Tang | H02K 33/18 |
| 2021/0211030 | A1 * | 7/2021 | Li | H02K 33/18 |
| 2022/0278599 | A1 * | 9/2022 | Cui | H02K 33/16 |
| 2022/0311319 | A1 * | 9/2022 | Cui | H02K 33/16 |
| 2023/0378862 | A1 * | 11/2023 | Mao | H02K 33/16 |

* cited by examiner

100

LINEAR VIBRATION MOTOR WITH WEIGHT HAVING TWO DRIVING ASSEMLBIESS AND MAGNETS WITH COMMON POLE PLATE AND OTHER PLATES

TECHNICAL FIELD

The present disclosure relates to the field of vibration motors, and in particular, to a linear vibration motor.

BACKGROUND

A linear motor is a transmission device that directly converts electrical energy into linear motion mechanical energy without any intermediate conversion mechanism.

A conventional linear vibration motor includes a housing, a vibrator, and a stator. The vibrator is fixedly and elastically supported in the housing by a V-shaped or C-shaped spring bracket. The vibrator includes a weight, a magnet, and a pole plate. When a height of a product is limited, a driving force applied to the vibrator is limited. If the driving force is increased by thickening the magnet or the pole plate, an effect thereof is not obvious, and it is difficult to meet a design requirement.

Therefore, there is a need to provide a new linear vibration motor to solve the above technical problems.

SUMMARY

In an aspect, the present disclosure provides a linear vibration motor, including: a housing, a weight suspended in the housing, at least two driving assemblies driving the weight to horizontally vibrate, and an elastic connector elastically supporting the weight. The weight includes an inner wall enclosing to form a through hole, each of the at least two driving assemblies includes a solenoid fixed to the housing and a magnet assembly fixed to the inner wall of the weight and vibrating together with the weight, the magnet assembly includes first magnets arranged at two sides of the solenoid along a vibrating direction of the weight, the first magnets are magnetized along a direction perpendicular to the vibrating direction of the weight, the first magnets at the two sides of the solenoid have poles of a same polarity opposite to each other, each of the first magnets includes a common magnet located between two adjacent solenoids and shared by two adjacent driving assemblies.

As an improvement, the inner wall of the weight includes a first inner wall extending along the vibrating direction of the weight and a second inner wall extending along the direction perpendicular to the vibrating direction of the weight, and the second inner wall are provided with a receiving groove for fixing two ends of the common magnet.

As an improvement, the magnet assembly further includes a first pole plate arranged between the first inner wall of the weight and the first magnet.

As an improvement, the magnet assembly includes second magnets arranged at two ends of the solenoid along the direction perpendicular to the vibrating direction of the weight, the second magnets are magnetized along the vibrating direction of the weight, and the second magnets at the two ends of the solenoid have poles of a same polarity opposite to each other.

As an improvement, the magnet assembly further includes a second pole plate arranged between the second inner wall of the weight and the second magnet.

In another aspect, the present disclosure provides a linear vibration motor, including a housing, a weight suspended in the housing, at least two driving assemblies driving the weight to horizontally vibrate, and an elastic connector elastically supporting the weight. The weight includes an inner wall enclosing to form a through hole, each of the at least two driving assemblies includes a solenoid fixed to the housing and a magnet assembly fixed to the inner wall of the weight and vibrating together with the weight, the magnet assembly including first magnets arranged at two sides of the solenoid along a vibrating direction of the weight and first pole plates attached to outer sides of the first magnets, each of the at least two driving assemblies includes two first magnets, the first magnets are magnetized along a direction perpendicular to the vibrating direction of the weight, the first magnets at the two sides of the solenoid have poles of a same polarity opposite to each other, each of the first pole plates includes a common pole plate located between two adjacent solenoids and shared by two adjacent driving assemblies, two first magnets close to each other in the two adjacent driving assemblies are attached to two opposite surfaces of the common pole plate.

As an improvement, the inner wall of the weight includes a first inner wall extending along the vibrating direction of the weight and a second inner wall extending along the direction perpendicular to the vibrating direction of the weight, and two ends of the common pole plate are fixed to the second inner wall.

As an improvement, the first pole plate further includes an auxiliary pole plate arranged between the first inner wall of the weight and the first magnet.

As an improvement, the magnet assembly includes second magnets arranged at two ends of the solenoid along the direction perpendicular to the vibrating direction of the weight, the second magnets are magnetized along the vibrating direction of the weight, and the second magnets at the two ends of the solenoid have poles of a same polarity opposite to each other.

As an improvement, the magnet assembly further includes a second pole plate arranged between the second inner wall of the weight and the second magnet.

DESCRIPTION OF EMBODIMENTS

Figure 1:
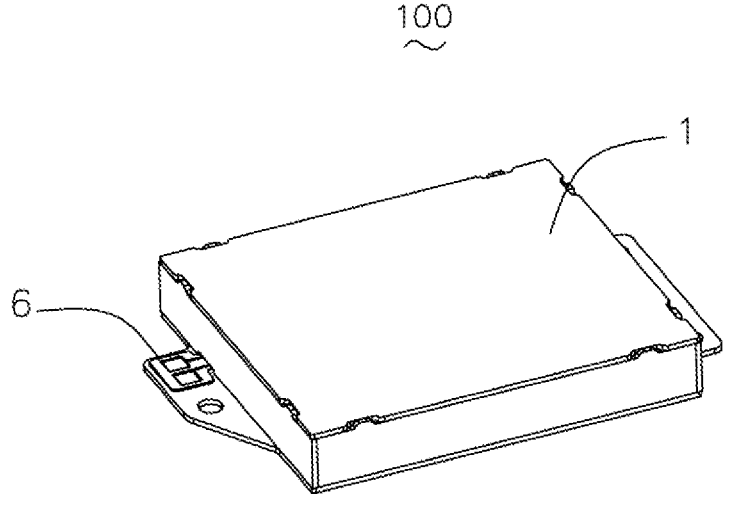
FIG. 1 is a perspective view of a linear vibration motor according to a first embodiment of the present disclosure.
Figure 2:
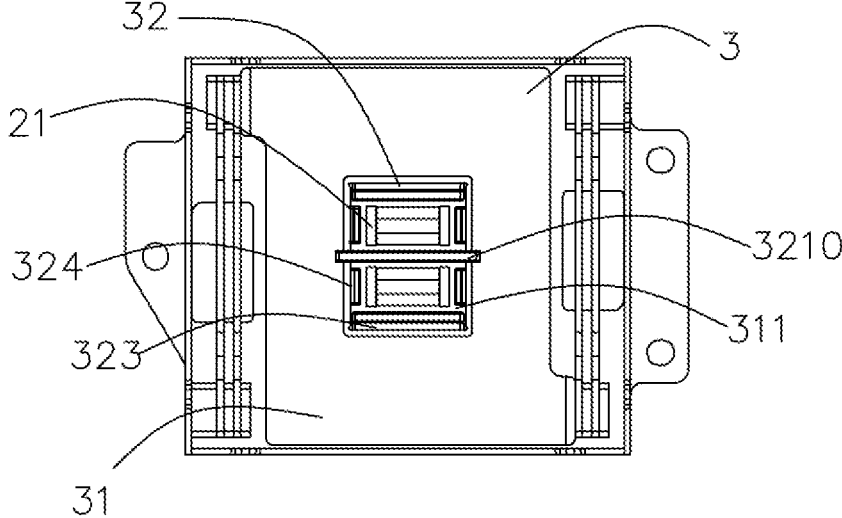
FIG. 2 is a perspective view of some components of the linear vibration motor shown in FIG. 1.

The technical solutions in the embodiments of the present disclosure will be clearly and completely described below with reference to the accompanying drawings in the embodiments of the present disclosure. It should be noted that, the described embodiments are merely a part of instead of all of the embodiments of the present disclosure. Based on the embodiments in the present disclosure, all other embodiments obtained by those of ordinary skill in the art without creative efforts fall within a scope of the present disclosure.

Referring to FIG. 1 to FIG. 4 together, a first embodiment of the present disclosure provides a linear vibration motor 100, including a housing 1, a stator 2 mounted in the housing 1, a vibrator 3, an elastic connector 4 suspending the vibrator 3 in the housing 1, and a stopping sheet 5 and a circuit board 6 that are fixed to two sides of the housing 1.

The housing 1 includes an upper cover 11, a lower cover 12 arranged opposite to the upper cover 11, and an enclosure wall 13 connecting the upper cover 11 and the lower cover. The upper cover 11, the lower cover 12, and the enclosure wall 13 encloses to form a space for receiving the stator 2 and the vibrator 3. The stator 2 is fixedly mounted to the lower cover 12, and the circuit board 6 partially extends out of the housing 1.

The stator 2 includes a solenoid 21 fixed to the lower cover 12. At least two solenoids 21 are provided, and are arranged in parallel along a direction perpendicular to a vibrating direction of the vibrator 3. That is, an axis of each of the solenoids 21 is parallel to the vibrating direction of the vibrator 3. Each of the solenoids 21 includes an iron core 211 and a coil 212 wound around the iron core 211. The coil 212 is electrically connected to the circuit board 6, and an alternating current is applied to the coil 212. In this embodiment, two solenoids 21 are provided.

The vibrator 3 is suspended in the housing 1 through the elastic connector 4, and the vibrator vibrates left and right in a horizontal direction so that the linear vibration motor 100 provides a sense of vibration. The vibrator 3 includes a weight 31 having a through hole 311 and a magnet assembly 32 fixed in the through hole 311 of the weight 31 and vibrating together with the weight 31. The weight 31 includes an inner wall 312 enclosing to form the through hole 311. The magnet assembly 32 is attached to the inner wall 312. The inner wall 312 of the weight 31 includes a first inner wall 3121 extending along the vibrating direction of the weight 31 and a second inner wall 3122 extending along the direction perpendicular to the vibrating direction of the weight 31. One magnet assembly 32 is arranged around one corresponding solenoid 21 and forms a driving assembly with the solenoid 21. At least two driving assemblies are provided. In this embodiment, two driving assemblies are provided.

The magnet assembly 32 includes first magnets 321 arranged at two sides of the solenoid 21 along a vibrating direction of the vibrator 3, second magnets 322 arranged at two ends of the solenoid 21 along a direction perpendicular to the vibrating direction of the vibrator 3, a first pole plate 323 arranged between the first inner wall 3121 of the weight 31 and the first magnet 321, and a second pole plate 324 arranged between the second inner wall 3122 of the weight 31 and the second magnet 322. The first magnet 321 includes a common magnet 3210 located between two adjacent solenoids 21 and shared by two adjacent driving assemblies. The second inner wall 3122 is provided with a receiving groove 3123 for fixing two ends of the common magnet. Two second magnets 322 are provided for each driving assembly, and two ends of the solenoid 21 are each provided with one of the second magnets 322. The first magnet 321 is magnetized along a direction perpendicular to the vibrating direction of the weight 31, and the first magnets 321 at the two sides of the solenoid 21 have poles of a same polarity opposite to each other. The second magnet 322 is magnetized along the vibrating direction of the weight 31, and the second magnets 322 at the two ends of the solenoid 21 have poles of a same polarity opposite to each other.

Figure 3:
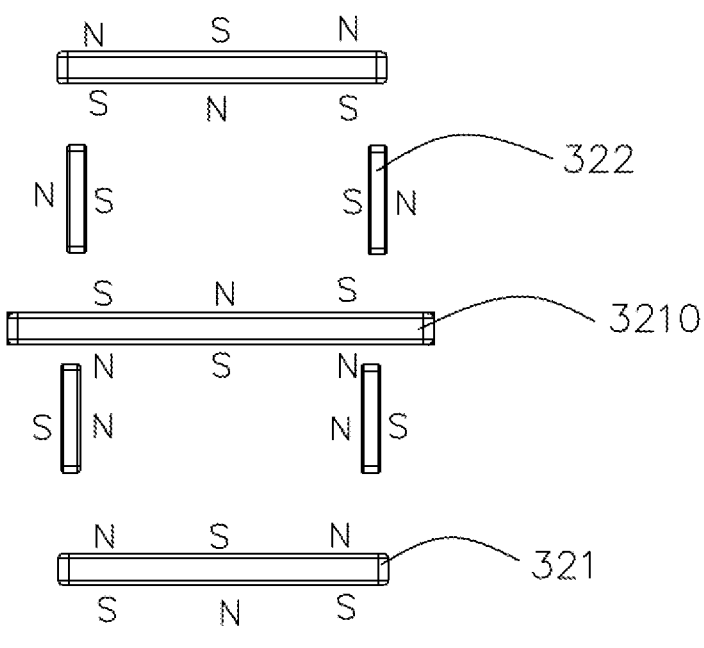
FIG. 3 is a schematic diagram of polarity of a magnet in the linear vibration motor shown in FIG. 1.
Figure 4:
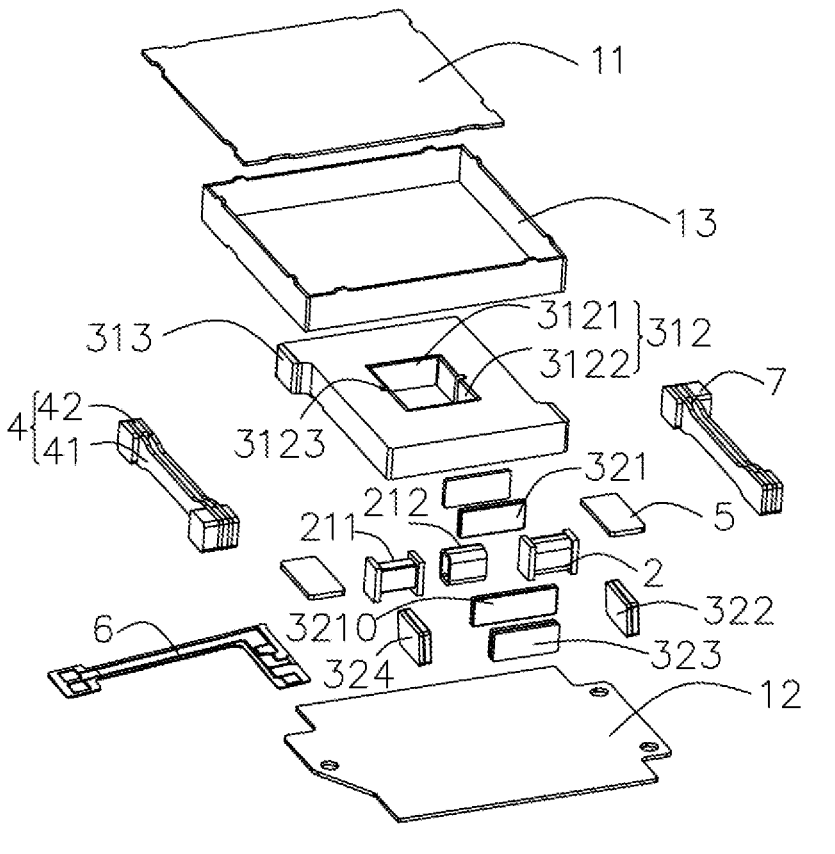
FIG. 4 is an exploded view of the linear vibration motor shown in FIG. 1.

In this embodiment, adjacent driving assemblies share one first magnet. That is, three first magnets 321 are provided for each two driving assemblies. The first magnet 321 may be magnetized in a single segment, or magnetized in multiple segments. Magnetization in three segments is taken as an example in this embodiment. As shown in FIG. 3, magnetization directions of adjacent segments of the first magnet 321 are opposite. In this embodiment, the first magnet 321 and the second magnet 322 are bonded and fixed to the first pole plate 323 and the second pole plate 324 by glue.

The weight 31 is provided with a protruding portion 313 extending along the vibrating direction of the vibrator 3, the protruding portion 313 protrudes and extends from a diagonal position of the weight 31, and the elastic connector 4 is fixed to the protruding portion 313.

The alternating current is applied to the coil 212 to cut a magnetic induction line of the magnet assembly 32 to generate an induced electromotive force, so that the magnet assembly 32 and the weight 31 fixed thereto vibrate left and right reciprocally, providing a sense of motor vibration.

The elastic connector 4 elastically supports the vibrator 3. The elastic connector 4 has one end connected to the weight 31 and another end connected to the housing 1 through a soldering lug 7, so as to provide an elastic recovery force for the vibrator 3. The elastic connector 4 includes at least two plate-shaped elastic pieces 41 arranged in parallel and a spacer 42 arranged at two ends of adjacent elastic pieces 41 to separate two adjacent elastic pieces 41.

The stopping sheet 5 is fixed to the lower cover 12, and located on a vibration path of the vibrator 3 to limit displacement of the vibrator 3.

Figure 5:
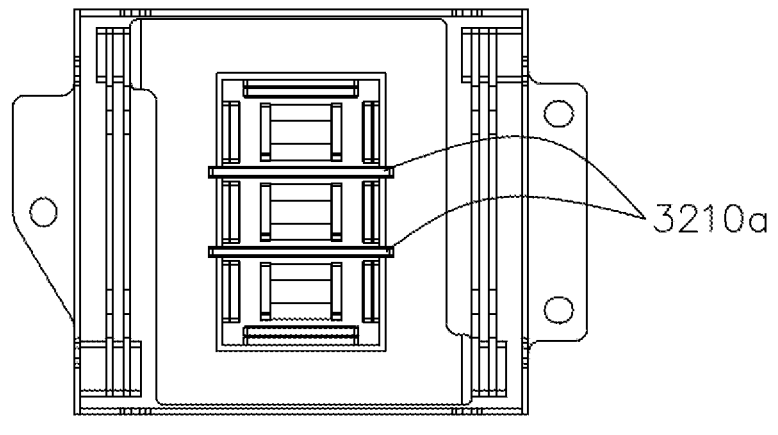
FIG. 5 is a perspective view of some components of a linear vibration motor according to a second embodiment of the present disclosure.

In a second embodiment of the present disclosure, as shown in FIG. 5, other structures are all the same as those in the first embodiment, and differences are as follows. Three driving assemblies are provided in this embodiment, and two adjacent driving assemblies share a common magnet 3210a. Therefore, in this embodiment, there are two common magnets 3210a.

Figure 6:
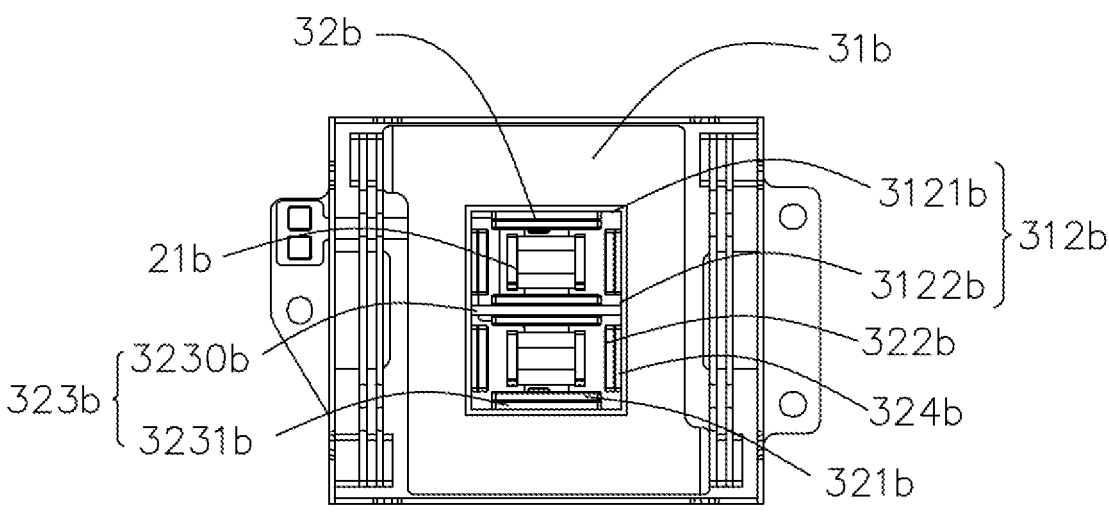
FIG. 6 is a perspective view of some components of a linear vibration motor according to a third embodiment of the present disclosure.

As shown in FIG. 6, a third embodiment of the present disclosure provides a linear vibration motor, in which other structures are the same as those in the first embodiment, and a difference lies in a magnet assembly 32b. At least two driving assemblies are provided. Each of the driving assemblies includes a solenoid 21 fixed to the housing and a magnet assembly 32b fixed to an inner wall 312b of the weight 31b and vibrating together with the weight 32b. The magnet assembly 32b includes first magnets 321b arranged at two sides of the solenoid 21b along a vibrating direction of the weight 31b, second magnets 322b arranged at two ends of the solenoid 21b along a direction perpendicular to the vibrating direction of the weight 31b, a first pole plate 323b arranged between a first inner wall 3121b of the weight 31b and the first magnet 321b, and a second pole plate 324b arranged between a second inner wall 3122b of the weight 31b and the second magnet 322b. The first magnet 321b is magnetized along a direction perpendicular to the vibrating direction of the weight 31b, and the first magnets 321b at two sides of the solenoid 21b have poles of a same polarity opposite to each other.

The first pole plate 323b includes a common pole plate 3230b located between two adjacent solenoids 21 and shared by two adjacent driving assemblies, and two ends of the common pole plate 3230*b* are fixed to the second inner wall 3122*b*. Each of the driving assemblies includes two first magnets 321*b*, two first magnets 321*b* close to each other in the two adjacent driving assemblies are attached to two opposite surfaces of the common pole plate 3230*b*, and magnetization directions of the two first magnets 321*b* are the same. The first pole plate 323*b* further includes an auxiliary pole plate 3231*b* arranged between the first inner wall 3121*b* of the weight 31*b* and the first magnet 321*b*.

In this embodiment, in each driving assembly, two first magnets 321*b* are provided, two first pole plates 3232*b* are also provided, and adjacent driving assemblies share a first pole plate 323*b*. The first magnet 321*b* may be magnetized in a single segment, or magnetized in multiple segments.

Figure 7:
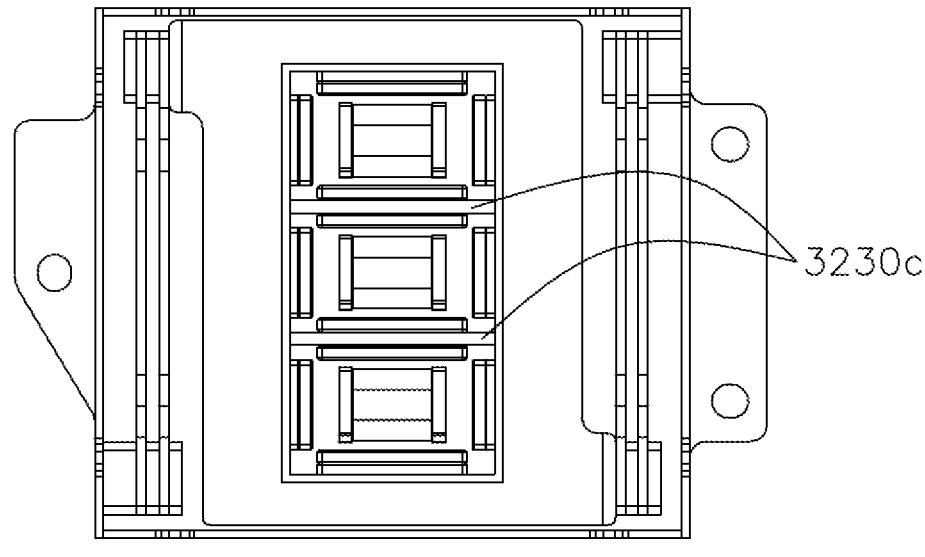
FIG. 7 is a perspective view of some components of a linear vibration motor according to a fourth embodiment of the present disclosure.

In a fourth embodiment of the present disclosure, as shown in FIG. 7, other structures are all the same as those in the third embodiment, and differences are as follows. Three driving assemblies are provided in this embodiment, and two adjacent driving assemblies share a common pole plate 3230*c*. Therefore, in this embodiment, there are two common pole plates 3230*c*.

The number of the driving assembly is not limited in the present disclosure, and a corresponding number may be set according to an actual requirement.

Compared with the related art, the present disclosure provides a linear vibration motor, including a housing, a weight suspended in the housing, a driving assembly driving the weight to horizontally vibrate, and an elastic connector elastically supporting the weight. The weight includes an inner wall enclosing to form a through hole. At least two driving assemblies are provided. Each of the driving assemblies includes a solenoid fixed to the housing and a magnet assembly fixed to the inner wall of the weight and vibrating together with the weight. The magnet assembly includes first magnets arranged at two sides of the solenoid along a vibrating direction of the weight. The first magnets are magnetized along a direction perpendicular to the vibrating direction of the weight. The first magnets at two sides of the solenoid have poles of a same polarity opposite to each other. Each of the first magnets includes a common magnet located between two adjacent solenoids and shared by two adjacent driving assemblies. The present disclosure further provides a linear vibration motor, including a housing, a weight suspended in the housing, a driving assembly driving the weight to horizontally vibrate, and an elastic connector elastically supporting the weight. The weight includes an inner wall enclosing to form a through hole. At least two driving assemblies are provided. Each of the driving assemblies includes a solenoid fixed to the housing and a magnet assembly fixed to the inner wall of the weight and vibrating together with the weight. The magnet assembly includes first magnets arranged at two sides of the solenoid along a vibrating direction of the weight and first pole plates attached to outer sides of the first magnets. Each of the driving assemblies includes two first magnets. The first magnets are magnetized along a direction perpendicular to the vibrating direction of the weight. The first magnets at two sides of the solenoid have poles of a same polarity opposite to each other. Each of the first pole plates includes a common pole plate located between two adjacent solenoids and shared by two adjacent driving assemblies. The two first magnets close to each other in the two adjacent driving assemblies are attached to two opposite surfaces of the common pole plate.

The linear vibration motor of the present disclosure adopts a multi-magnetic-circuit scheme, and the driving force applied to the weight can be significantly increased, which can be increased by at least 1.8 times when total resistance and an overall size are definite. At the same time, the driving assemblies share part of the magnet or pole plate, thereby simplifying the structure and reducing manufacturing costs.

The above descriptions are only some embodiments of the present disclosure. It should be pointed out herein that, for those of ordinary skill in the art, improvements can also be made without departing from the creative concept of the present disclosure, all of which shall fall within a scope of the present disclosure.

What is claimed is:

1. A linear vibration motor, comprising a housing, a weight suspended in the housing, at least two driving assemblies driving the weight to horizontally vibrate, and an elastic connector elastically supporting the weight, wherein the weight comprises an inner wall enclosing to form a through hole, each of the at least two driving assemblies comprises a solenoid fixed to the housing and a magnet assembly fixed to the inner wall of the weight and vibrating together with the weight, each magnet assembly comprising two first magnets arranged at two sides of the solenoid along a vibrating direction of the weight and first pole plates attached to outer sides of the first magnets, the first magnets are magnetized along a direction perpendicular to the vibrating direction of the weight, the first magnets at the two sides of the solenoid have poles of a same polarity opposite to each other, the first pole plates comprises a common pole plate located between two adjacent solenoids and shared by two adjacent driving assemblies, two first magnets close to each other in the two adjacent driving assemblies are attached to two opposite surfaces of the common pole plate, and magnetization directions of the two first magnets are the same.

2. The linear vibration motor as described in claim 1, wherein the inner wall of the weight comprises a first inner wall extending along the vibrating direction of the weight and a second inner wall extending along the direction perpendicular to the vibrating direction of the weight, and two ends of the common pole plate are fixed to the second inner wall.

3. The linear vibration motor as described in claim 2, wherein the first pole plate further comprises an auxiliary pole plate arranged between the first inner wall of the weight and the first magnet.

4. The linear vibration motor as described in claim 2, wherein the magnet assembly comprises second magnets arranged at two ends of the solenoid along the direction perpendicular to the vibrating direction of the weight, the second magnets are magnetized along the vibrating direction of the weight, and the second magnets at the two ends of the solenoid have poles of a same polarity opposite to each other.

5. The linear vibration motor as described in claim 4, wherein the magnet assembly further comprises a second pole plate arranged between the second inner wall of the weight and the second magnet.

* * * * *